(12) United States Patent
Venugopalan et al.

(10) Patent No.: US 11,301,839 B2
(45) Date of Patent: Apr. 12, 2022

(54) METHOD AND SYSTEM FOR MAKING A SECURE PAYMENT TRANSACTION

(71) Applicant: MasterCard Asia/Pacific Pte. Ltd., Singapore (SG)

(72) Inventors: Vijin Venugopalan, Singapore (SG); Benjamin Charles Gilbey, Singapore (SG); Prashant Sharma, Madison, NJ (US)

(73) Assignee: MASTERCARD ASIA/PACIFIC PTE. LTD., Singapore (SG)

( * ) Notice: Subject to any disclaimer, the term of this patent is extended or adjusted under 35 U.S.C. 154(b) by 864 days.

(21) Appl. No.: 14/993,447

(22) Filed: Jan. 12, 2016

(65) Prior Publication Data
US 2016/0203475 A1 Jul. 14, 2016

(51) Int. Cl.
*G06Q 20/36* (2012.01)
*G06Q 20/38* (2012.01)
*G06Q 20/40* (2012.01)

(52) U.S. Cl.
CPC ..... *G06Q 20/3672* (2013.01); *G06Q 20/3821* (2013.01); *G06Q 20/401* (2013.01); *G06Q 2220/00* (2013.01)

(58) Field of Classification Search
None
See application file for complete search history.

(56) References Cited

U.S. PATENT DOCUMENTS 5,883,810 A * 3/1999 Franklin ............ G06Q 20/02
235/379
6,327,578 B1 * 12/2001 Linehan ............ G06Q 20/02
705/65

(Continued)

FOREIGN PATENT DOCUMENTS

EP 1028401 A 8/2000
EP 1400906 A1 3/2004

(Continued)

OTHER PUBLICATIONS

Mark E. Peters (Emerging eCommerce Credit and Debit Card Protocols) (Year: 2002).*

(Continued)

*Primary Examiner* — Mamon Obeid
(74) *Attorney, Agent, or Firm* — Buckley, Maschoff & Talwalkar LLC

(57) ABSTRACT

A method and system are presented for making a secure payment transaction using a payment card associated with a consumer which has been registered with a digital wallet. A secure server is arranged, in response to a request from a merchant server in relation to the consumer, to extract from the digital wallet payment credentials for the payment card. The secure server uses the payment credentials and the identity of the merchant server to generate a token. The token is provided to the merchant. To effect a payment transaction, the merchant server returns the token to the secure server with details of the desired payment transaction, and the secure server arranges for the payment transaction to occur, and notifies the merchant server. The merchant server does not receive the payment credentials of the payment card during this process, so even if its security is compromised, the payment credentials are not at risk.

17 Claims, 4 Drawing Sheets

(56) References Cited

U.S. PATENT DOCUMENTS

| | | | | |
|---|---|---|---|---|
| 6,484,182 B1* | 11/2002 | Dunphy | G06Q 10/06 | 707/999.102 |
| 7,292,999 B2* | 11/2007 | Hobson | G06Q 20/02 | 705/64 |
| 7,383,231 B2* | 6/2008 | Gupta | G06Q 20/085 | 705/64 |
| 7,502,760 B1* | 3/2009 | Gupta | G06Q 20/367 | 705/64 |
| 8,335,745 B2* | 12/2012 | Perlman | G06Q 20/04 | 705/64 |
| 9,419,841 B1* | 8/2016 | Kozolchyk | H04L 67/1097 | |
| 9,537,857 B1* | 1/2017 | Koved | H04L 63/06 | |
| 9,565,212 B2* | 2/2017 | Faltyn | H04W 12/08 | |
| 9,589,298 B2* | 3/2017 | Pant | G06Q 40/02 | |
| 9,602,508 B1* | 3/2017 | Mahaffey | H04L 63/10 | |
| 9,779,345 B2* | 10/2017 | Gaddam | G06K 19/06103 | |
| 9,846,878 B2* | 12/2017 | Kumnick | G06Q 20/3674 | |
| 10,133,861 B2* | 11/2018 | Guionneau | H04L 9/3263 | |
| 10,223,692 B2* | 3/2019 | Jeon | G06Q 20/32 | |
| 10,289,835 B1* | 5/2019 | Machani | G06F 21/6209 | |
| 10,356,053 B1* | 7/2019 | Zubovsky | H04L 63/0428 | |
| 10,489,852 B2* | 11/2019 | Bhat | G06Q 40/00 | |
| 2001/0037300 A1* | 11/2001 | Miyazaki | G06Q 20/1085 | 705/43 |
| 2002/0049655 A1* | 4/2002 | Bennett | G06Q 20/18 | 705/35 |
| 2002/0133467 A1* | 9/2002 | Hobson | G06Q 20/02 | 705/64 |
| 2003/0028470 A1* | 2/2003 | Dutta | G06Q 30/06 | 705/37 |
| 2003/0028481 A1* | 2/2003 | Flitcroft | G06Q 20/105 | 705/39 |
| 2003/0061170 A1* | 3/2003 | Uzo | G06Q 20/06 | 705/64 |
| 2004/0059682 A1* | 3/2004 | Hasumi | G06Q 20/04 | 705/64 |
| 2004/0078273 A1* | 4/2004 | Loeb | G06Q 30/0613 | 705/14.27 |
| 2004/0162997 A1* | 8/2004 | Hopmann | H04L 63/104 | 713/154 |
| 2005/0102188 A1* | 5/2005 | Hutchison | G06Q 20/02 | 705/39 |
| 2005/0119978 A1* | 6/2005 | Ates | G06Q 20/341 | 705/67 |
| 2005/0154643 A1* | 7/2005 | Doan | G06Q 20/24 | 705/26.1 |
| 2005/0166263 A1* | 7/2005 | Nanopoulos | G06F 21/31 | 726/7 |
| 2005/0192896 A1* | 9/2005 | Hutchison | G06Q 20/10 | 705/40 |
| 2006/0235795 A1* | 10/2006 | Johnson | G06Q 20/02 | 705/44 |
| 2006/0235796 A1* | 10/2006 | Johnson | G06Q 20/02 | 705/44 |
| 2007/0101152 A1* | 5/2007 | Mercredi | G06F 21/34 | 713/185 |
| 2008/0223918 A1* | 9/2008 | Williams | G06Q 20/20 | 235/379 |
| 2009/0192940 A1* | 7/2009 | Mann, III | G06Q 20/04 | 705/44 |
| 2010/0088237 A1* | 4/2010 | Wankmueller | G06Q 20/12 | 705/75 |
| 2010/0100952 A1* | 4/2010 | Sample | H04L 67/22 | 726/9 |
| 2011/0087592 A1* | 4/2011 | van der Veen | G06Q 20/227 | 705/44 |
| 2012/0259782 A1* | 10/2012 | Hammad | G06Q 20/12 | 705/44 |
| 2012/0317036 A1* | 12/2012 | Bower | G06Q 20/02 | 705/75 |
| 2012/0324242 A1* | 12/2012 | Kirsch | G06F 21/6245 | 713/189 |
| 2013/0018643 A1* | 1/2013 | Sharma | G01R 31/318357 | 703/14 |
| 2013/0263212 A1* | 10/2013 | Faltyn | H04W 12/08 | 726/1 |
| 2013/0283361 A1* | 10/2013 | Rao | G06F 21/31 | 726/7 |
| 2014/0067674 A1* | 3/2014 | Leyva | G06Q 20/20 | 705/44 |
| 2014/0067675 A1* | 3/2014 | Leyva | G06Q 20/40 | 705/44 |
| 2014/0074637 A1* | 3/2014 | Hammad | G06Q 20/3227 | 705/21 |
| 2014/0164243 A1* | 6/2014 | Aabye | G06Q 20/027 | 705/44 |
| 2014/0189352 A1* | 7/2014 | Baskaran | G06F 21/6218 | 713/168 |
| 2014/0189808 A1* | 7/2014 | Mahaffey | H04L 63/083 | 726/4 |
| 2014/0222668 A1* | 8/2014 | Wall | G06Q 20/383 | 705/39 |
| 2014/0223516 A1* | 8/2014 | Vongsouvanh | H04L 63/0492 | 726/4 |
| 2014/0223573 A1* | 8/2014 | Reedy | H04L 63/0428 | 726/26 |
| 2014/0229375 A1* | 8/2014 | Zaytzsev | G06Q 20/382 | 705/44 |
| 2014/0236792 A1* | 8/2014 | Pant | G06Q 40/00 | 705/35 |
| 2014/0310183 A1* | 10/2014 | Weber | G06Q 20/20 | 705/71 |
| 2014/0337230 A1* | 11/2014 | Bacastow | G06Q 20/322 | 705/44 |
| 2014/0351126 A1* | 11/2014 | Priebatsch | G06Q 20/40 | 705/44 |
| 2015/0012443 A1* | 1/2015 | Bhat | G06Q 20/108 | 705/50 |
| 2015/0134519 A1* | 5/2015 | Wankmueller | G06Q 20/12 | 705/41 |
| 2015/0199689 A1* | 7/2015 | Kumnick | G06Q 20/3674 | 705/67 |
| 2015/0262161 A1* | 9/2015 | McMullan | G06Q 20/3278 | 705/39 |
| 2015/0269566 A1* | 9/2015 | Gaddam | G06Q 20/385 | 705/67 |
| 2015/0278550 A1* | 10/2015 | Lin | H04L 63/0428 | 713/153 |
| 2015/0324789 A1* | 11/2015 | Dvorak | H04W 12/06 | 705/67 |
| 2016/0028550 A1* | 1/2016 | Gaddam | H04L 9/3263 | 713/173 |
| 2016/0127454 A1* | 5/2016 | Maheshwari | H04L 41/0803 | 709/223 |
| 2016/0140335 A1* | 5/2016 | Proulx | H04L 63/083 | 726/6 |
| 2016/0148197 A1* | 5/2016 | Dimmick | G06Q 20/36 | 705/67 |
| 2016/0203475 A1* | 7/2016 | Venugopalan | G06Q 20/385 | 705/66 |
| 2016/0224983 A1* | 8/2016 | Cash | G06Q 20/385 | |
| 2016/0267467 A1* | 9/2016 | Rutherford | G06Q 20/385 | |
| 2016/0321653 A1* | 11/2016 | Jacobs | G06Q 20/3224 | |
| 2016/0350747 A1* | 12/2016 | Pruthi | H04L 63/061 | |
| 2016/0350751 A1* | 12/2016 | Keys | G06Q 20/3829 | |
| 2017/0257215 A1* | 9/2017 | Huang | H04L 63/083 | |
| 2017/0323299 A1* | 11/2017 | Davis | G06Q 20/204 | |
| 2018/0005228 A1* | 1/2018 | Anderson | G06Q 20/383 | |
| 2018/0025342 A1* | 1/2018 | Shauh | G06Q 20/322 | 705/44 |
| 2018/0039615 A1* | 2/2018 | Trivedi | G06F 40/221 | |
| 2018/0075455 A1* | 3/2018 | Kumnick | G06Q 20/4016 | |
| 2018/0150836 A1* | 5/2018 | Kumar | G06Q 20/3829 | |
| 2018/0247294 A1* | 8/2018 | Shauh | G06Q 20/3226 | |
| 2019/0080312 A1* | 3/2019 | Yeager | G06Q 20/3223 | |
| 2019/0158487 A1* | 5/2019 | Hayes | H04W 12/069 | |
| 2019/0386831 A1* | 12/2019 | Jamkhedkar | H04L 9/3213 | |
| 2021/0342850 A1* | 11/2021 | Kumar | G06Q 20/40145 | |

(56) References Cited

U.S. PATENT DOCUMENTS

FOREIGN PATENT DOCUMENTS

| | | |
|---|---|---|
| JP | 2002024716 A | 1/2002 |
| JP | 2004094619 A1 | 3/2004 |
| JP | 2008152338 A | 7/2008 |
| JP | 2011209861 A | 10/2011 |

OTHER PUBLICATIONS

PCT International Search Report and Written Opinion for PCT/SG2016/050014 dated Apr. 12, 2016, 7 pp.

* cited by examiner

METHOD AND SYSTEM FOR MAKING A SECURE PAYMENT TRANSACTION

CROSS-REFERENCE TO RELATED APPLICATION

This application is a U.S. National Stage filing under 35 U.S.C. § 119, based on and claiming benefit of and priority to SG Patent Application No. 10201500276V filed Jan. 14, 2015.

FIELD OF INVENTION

This invention relates to methods and systems for permitting consumers to make a purchase, for example, but not exclusively, at a point of sale location, such as a retail store, a café or restaurant, or at a location where they pay for a service, such as in a taxi.

BACKGROUND

It has become common for consumers provided with a payment card (credit card or debit card) to employ a digital wallet to make online purchases. One well-known system is the "Masterpass™" system offered by Mastercard International Inc. and depicted in FIG. 1.

A consumer uses software such as a browser running on a computer 101 associated with the consumer. The computer 101 is connected via the internet to a merchant server 102 (i.e. one operated by a "merchant" which retails, or offers for hire or rental, product(s) and/or service(s)). The details of one or more payment cards associated with the user are stored in a server 103 under the control of a bank which issued the cards ("issuing bank"). These details include "payment credentials", such as the primary account number (PAN), which is conventionally a 16-digit number. The server 103 operates as a "digital wallet", and the server 103 is designated in FIG. 1 as a "wallet provider". When the consumer wants to make a purchase from the merchant (which may be purchase of a physical item and/or of a service), the consumer controls the computer 101 to communicate with the merchant server 102 and make the purchase. During this process the consumer instructs the merchant server 102 that the purchase is to be paid for using a payment card having details which are stored in the digital wallet. The merchant server 102 submits a request to the wallet provider 103 including identity data specifying the identity of the user, so that the wallet provider 103 can obtain the corresponding payment credentials. If the details of multiple payment cards associated with the consumer are stored in the digital wallet, the consumer selects one of the payment cards, and the wallet provider 103 obtains the payment credentials of the corresponding card.

The wallet provider 103 sends a message to the merchant server 102 which includes the payment credentials of the (selected) payment card in the digital wallet. The merchant server 102 passes the message to its bank 104 (the "acquiring bank") which communicates with the bank which issued the payment card ("issuing bank") via a payment network, for example Banknet operated by MasterCard, to authorize and subsequently effect the transfer of the corresponding sum of money. Once the payment transaction is authorized, the merchant server 102 completes the purchase, e.g. dispatching a purchased item to the consumer.

This system, while having many advantageous features, has some disadvantageous features also. One is that it involves passing the payment credentials (which are highly confidential information) to the merchant site, which may not be entirely trustworthy (e.g. if the online merchant is hacked or a fraudulent merchant site).

SUMMARY OF INVENTION

The present invention proposes in general terms that, upon a request from a merchant server, a secure server uses the payment credentials stored by the wallet provider to generate a token. The token is provided to the merchant server. To effect a payment transaction, the merchant server returns the token to the secure server with details of the desired payment transaction, and the secure server arranges for the payment transaction to occur, and notifies the merchant server. The merchant server does not receive the payment credentials of the payment card during this process, so even if its security is compromised, the payment credentials are not at risk.

Furthermore, the token is preferably specific to the merchant (as well as to the payment card), so even if the token is stolen by a thief, the thief is not able to use it to make a purchase from another merchant.

Typically, the secure server is not the associated with the wallet provider. It may for example, be a separate "service provider" operated by a banking organization, such as a bank at which the merchant maintains an account (the "acquiring bank").

The invention is particularly applicable to a situation in which the consumer wants to purchase an item/service from a point-of-sale location, such as one which is physically distant from the merchant server in the sense that a telecommunications link is provided between them. The point-of-sale location may, for example, be a retail store, a restaurant or café, or even a mobile point-of-sale location such as a bus or a taxi cab. The merchant server in this case communicates with equipment located at the point-of-sale location to inform the equipment that the purchase has been authorized.

In an example, the equipment at the point-of-sale location may be responsible for calculating the transaction amount (e.g. if the purchase is of food and/or drink, the total price of the items the consumer has ordered plus any applicable taxes; or if the purchase is of a service, such as being driven on a certain journey by a taxi, the price of the service), and the transaction amount is communicated from the equipment at the point-of-sale location to the merchant server. The merchant then provides the secure server with the token and the transaction amount, so that the secure server can arrange for the transaction to be authorized and the payment to be made.

In preferred embodiments, a token is generated for each respective payment transaction. Thus, once the token has been used, a thief who acquires it cannot use it even with the same merchant.

The "payment card" referred to in this document is not necessarily a physical (e.g. plastic) card. Rather, the term refers to a credit card or debit card account, having a primary account number (PAN) maintained by a "card issuer" (typically, a bank). The PAN functions as payment credentials used when making a payment. Conventionally, the PAN is a 16-digit number, which, if a physical card exists, is printed on the card. However, a payment card can be used in the present invention irrespective of whether a physical card bearing the payment credentials exists.

BRIEF DESCRIPTION OF THE DRAWINGS

Embodiments of the invention will now be described for the sake of example only, with reference to the following drawings in which.

DETAILED DESCRIPTION

Figure 2:
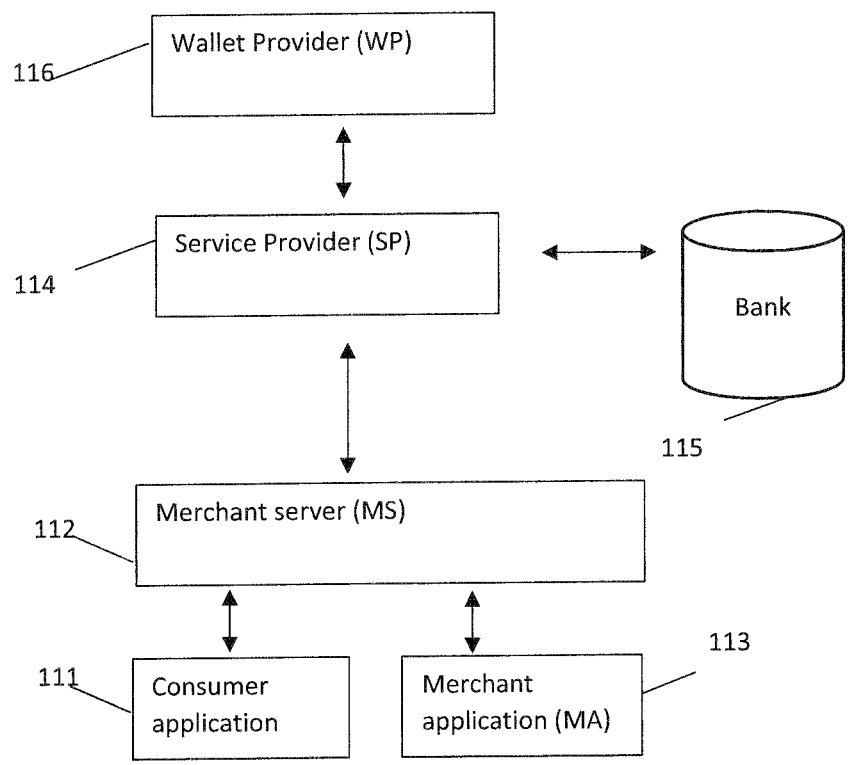
FIG. 2 illustrates a system which is an embodiment of the present invention.

Referring to FIG. 2, a system is shown which is an embodiment of the invention. The system performs a process which is described below with reference to FIGS. 3 and 4.

The system of FIG. 2 includes a consumer application 111 (CA) which runs on a computer (not shown) operated by a consumer, such as a personal computer, laptop or mobile device (e.g. a mobile phone or tablet computer). The consumer application is capable of communicating with a merchant server 112 (MS), typically over the internet. The merchant server 112, which is operated by a merchant (an individual or organization which supplies products and/or services in return for payment), may in fact comprise multiple physical servers cooperating together to provide a merchant website, offering one or more products and/or services.

The CA may be supplied by the merchant, and may be arranged to present to the consumer the item(s) (product(s) and/or service(s)) which the merchant supplies. It may include a database describing these item(s), or obtain the information as required by communicating with the merchant server 112.

The merchant also operates at one or more points-of-sale distant from the merchant server (e.g. at least 500 m, at least 10 km, and perhaps 10 s, 100 s or even 1000 s of kilometers distant from the merchant server). Indeed, the point-of-sale may be a mobile point-of-sale, such as one located in a vehicle (a taxi, bus, or train), which is able to give the consumer (and/or any accompanying persons) a ride. It may alternatively be at a station where vehicles arrive or depart.

At each point-of-sale there is respective equipment running an application associated with the merchant: a "merchant application (MA)". The consumer may be at one of these points-of-sale, and/or wishes to obtain a product and/or service delivered at this point of sale. The merchant application at this one of the points-of-sale is denoted by 112 in FIG. 2, and the merchant applications at any other points-of-sale are omitted from FIG. 2. These other points-of-sale play no role in the process described below.

The point-of-sale is typically equipped with any necessary physical items and/or personnel to implement the purchase. For example, if the purchase is of a physical product, that product may be located at the point-of-sale, so that the consumer may take it away following the purchase, or so that it can be delivered to him from the point-of-sale. In another example, if the purchase is of a food and/or beverage, the point-of-sale may be a café or restaurant, where the food and/or beverage may be prepared and consumed. In a further example, the point-of-sale may be at a location where a train, bus or taxi may be mounted or dismounted, with any necessary driver also being present. In yet a further example, purchase may relate to the rental of a physical item (e.g. a bicycle or car) and the point-of-sale may be a location where the consumer may obtain or return the physical item.

Note that the equipment running the merchant application may not be owned by the merchant, or dedicated to running the application. For example, it is possible to envisage a retail store providing equipment which is arranged to run a respective merchant application for each of a plurality of merchants. Each application would permit the consumer, when he or she is at the point-of-sale, to make a purchase of a product and/or service from the corresponding merchant.

The merchant is also able to communicate with a service provider 114 (SP). The merchant maintains a bank account with a bank 115 ("acquiring bank"), which typically also operates the service provider 114. The service provider 114 is, unlike the merchant server 112, assumed to be a secure environment. As in the system of FIG. 1, the consumer has a digital wallet provided by a wallet provider (WP) 116. The consumer has pre-registered one or more payment cards (credit cards and/or debit cards) with the wallet provider (WP) 116, which is able to access a database containing payment credentials of the registered cards, i.e. data which can be used to make a payment using the payment card. This data is typically the primary account number (PAN) which, conventionally, is a 16 digit number of the card. The wallet provider (WP) is typically operated by a bank which issued the pre-registered payment card(s). The service provider 114 is able to interact with the wallet provider 116 to access the payment credentials, but since the wallet provider 116 is assumed to be secure, this does not compromise the security of the system. Note that the system of FIG. 1 does not contain an element corresponding to the service provider 114. The service provider 114 is PCI (payment card industry) compliant; that is, it conforms to the PCI data security standard (PCI DSS) maintained by the PCI Security Standards Council.

Figure 3:
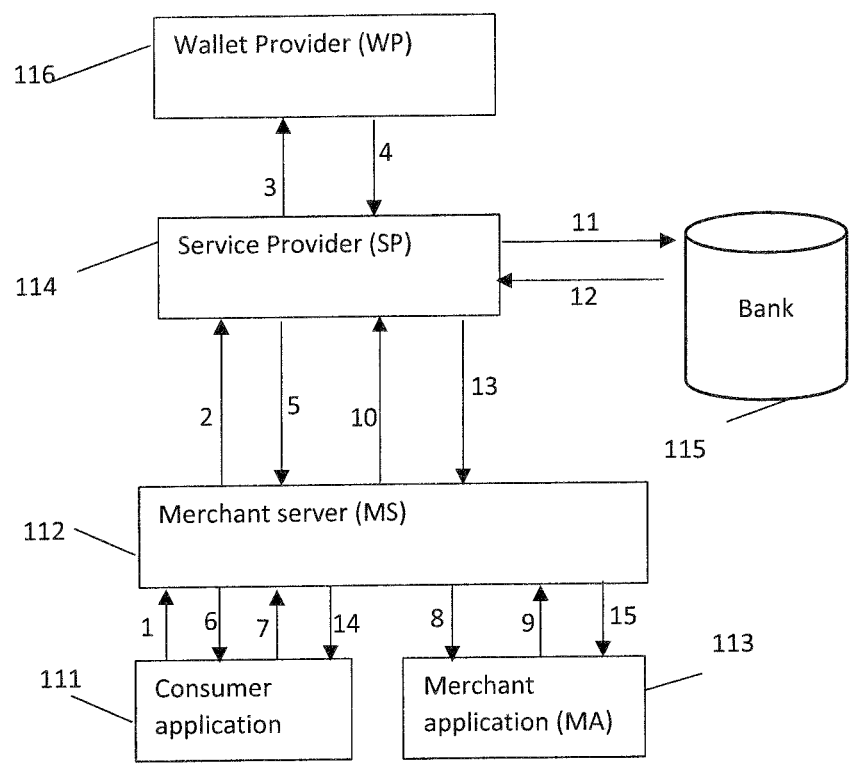
FIG. 3 illustrates, for the system of FIG. 3, process steps which are performed by the system of FIG. 2 during a transaction process which is an embodiment of the invention.
Figure 4:
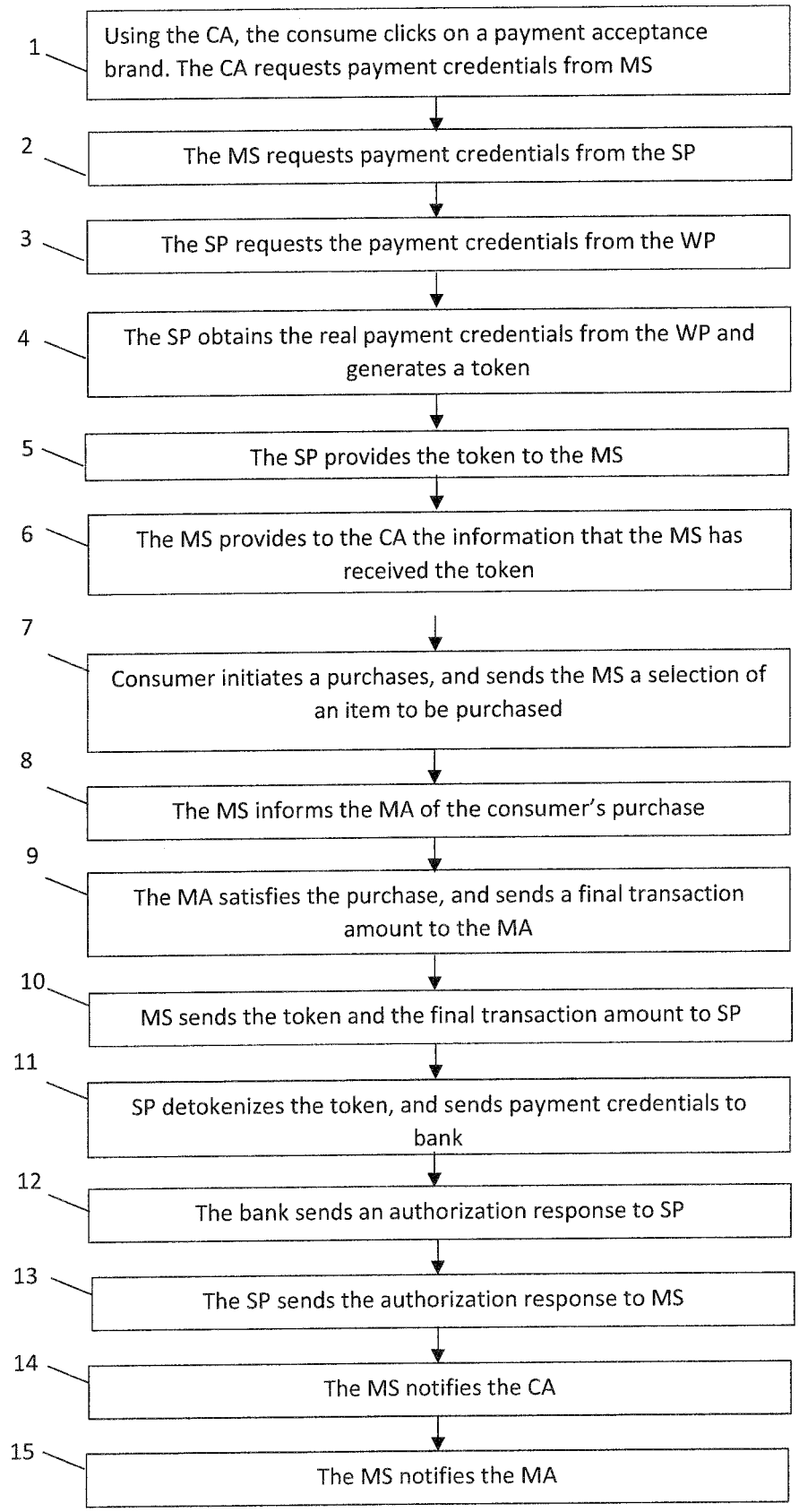
FIG. 4 is a flow diagram showing steps in the transaction process of the embodiment of FIG. 3.

Turning to FIG. 3 the various communications within the system when a payment transaction is to be made, are shown, numbered 1-15. FIG. 4 is a flowchart showing the steps 1-15 of the method which results in the respective communications 1-15.

In step 1, the consumer operates the consumer application 111 (CA), and decides to make a purchase, and instructs the consumer application 111 accordingly. At this stage, the consumer application 111 may display a number of different payment options (e.g. using respective payment methods), and the consumer selects to make a payment by the method proposed here. For example, he may click on branding (a payment acceptance brand) displayed by the consumer application 111 and associated with the present method. That is, it includes an acceptance of the use of a payment card registered with the digital wallet 116. Note that the displayed payment options may include multiple digital wallets (e.g. associated with different issuing banks), so that the consumer can select the appropriate digital wallet. The consumer application 111 then sends a request to the merchant server 112 (MS) to obtain payment credentials. This includes a message that a payment card registered with the digital wallet is to be used. The request further includes data specifying the identity of the point-of-sale, i.e. one at which the consumer is located and/or from which he or she wishes to receive a product and/or service. Specifically, it includes merchant information such as a unique merchant identifier for which a payment acceptance mark has been established.

In step 2, the merchant server 112 requests payment credentials from the service provider 114 (SP) by sending it a message.

In step 3, the service provider 114 requests payment credentials from the wallet provider 116 (WP) by sending it a message including the identity data.

Figure 1:
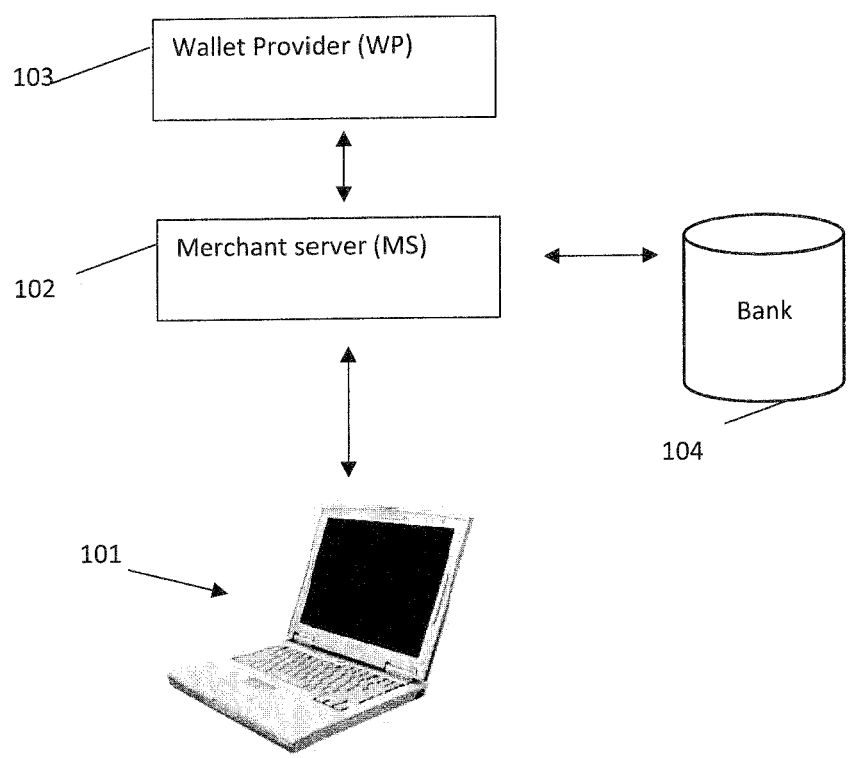
FIG. 1 is a diagram illustrating the operation of a prior art digital wallet system.

The wallet provider 116 then verifies the identity of the consumer by further steps which are not shown in FIG. 1, but are as in conventional methods. Typically, the WP renders to the consumer (e.g. using the CA which connects to the WP using the internet) a page where the consumer will have to enter identity data, such as a user name and, typically, a secret password. Alternatively, the wallet provider may use a so-called "2 factor authentication", by sending a one-time-pass (OTP) by SMS to a mobile device (perhaps the one on which the CA is running) associated with the consumer. This information is not transmitted through the service provider, but directly between the consumer and the wallet provider. The consumer can transmit the OTP back to the service provider 114 (e.g. directly over a telecommunications network, or the Internet). Using the identity of the consumer, the wallet provider 116 obtains payment credentials of a payment card associated with the consumer from its database.

If multiple payment cards associated with the consumer are registered with the wallet provider 116 which the consumer selected, then the consumer is enabled to select one of them.

This may be done by a separate process (not shown) of communication between the consumer and the wallet provider 116.

In step 4, the wallet provider 116 sends the service provider 114 the (real) payment credentials of the selected payment card from the wallet provider 116.

The service provider 114 then generates a token for the selected payment card. The token is preferably generated using the real payment credentials, and preferably, but not necessarily, has the format of payment card credentials (e.g. it too is a 16 digit number). It preferably also encodes the identity of the merchant. The token may be regarded an alternative payment credential linked to the original (i.e. real) payment credential transmitted by the wallet provider 116. The token may be a hexadecimal number or may mimic an ISO (independent sales organization) based card number. It may be generated by any conventional method, or for example, as described in U.S. patent application Ser. No. 14/514,290. It may subsequently be encrypted.

In step 5, the service provider 114 sends the token to the merchant server 112.

In step 6, the merchant server 112 sends the consumer application 111 a message saying that the merchant server 112 has received a token. The token is retained in the merchant server 112.

In step 7, the consumer initiates the purchase, rental or hire of a particular item (product and/or service). For example, if the consumer has ordered or been given a certain food and/or beverage, the consumer indicates that he or she wants to pay the bill for them. The consumer controls the consumer application 111 to send a message to the merchant server 112 specifying the item to be bought, In step 8 the merchant server 112 sends the merchant application 113 a message indicating that the consumer wants to make the purchase.

In step 9 the merchant application 113 sends the merchant server 112 a message which includes the amount of the transaction ("the final transaction amount"). For example, depending upon the nature of the merchant, this might be the total (including taxes) restaurant or café bill, taxi fare, etc.

In step 10, the merchant server 112 sends the consumer's token for the selected payment card, and the final transaction amount obtained in step 9, to the service provider 114, as a transaction authorization request.

In step 11, the service provider 114 decrypts the token received in the transaction authorization request (if it was encrypted), and performs a de-tokenization operation on the token, to retrieve the (real) payment credentials which the service provider 114 received in step 4. Detokenization means that the service provider 114 converts the token obtained from the merchant server 112 to the real payment credentials (funding PAN), such as by looking the token up in a mapping table. The service provider 114 sends the real payment credentials to the acquiring bank 115. Then, according to the same steps as the prior art the bank 115 obtains authorization from the issuer of the payment card ("issuing bank") for a payment of the final transaction amount via the payment network. The payment settlement and reconciliation will subsequently be carried out, according to a conventional protocol.

In step 12, the bank sends an authorization response to the service provider 114, indicating that the payment has been approved.

In step 13, the service provider 114 forwards the authorization response to the merchant server 112.

In step 14, the merchant server 112 notifies the consumer application 111 that the payment has been authorized. In step 15, the merchant server 112 notifies the merchant application 113 that the payment has been authorized. Note that steps 14 and 15 may alternately be performed in the opposite order or simultaneously.

Note that during this process the real payment credentials are only sent to the (secure) service provider 114, not to the (insecure) merchant server 112. Furthermore, the service provider 114 may store the payment credentials only for the time taken to generate the token, after which they can be deleted; the service provider regenerates the payment credentials in step 11.

The service provider 114 will only perform step 11 if it receives the token from the same merchant whose identity was used to generate the token. Thus, the token can only be used to make a payment using the merchant server 112. Therefore, if the token is stolen, the thief will not be able to use it to make a payment to another merchant.

Furthermore, the service provider 114 will preferably only accept a given token once. That is, when it receives the transaction authorization request, it checks that it has not previously received the token it contains, and only completes step 11 in the case that this check is positive. This means that after the transaction is completed, a thief who obtains it will not be able to use the token to make a subsequent payment via the merchant server 112. When the consumer wants to make a further transaction using the merchant 112, the entire process of FIGS. 3 and 4 must be repeated, including generating a new token. This new token will be different from the old token. For example, it may be generated using a clock time from a reference clock (e.g. maintained at the service provider 114) or counter associated with the wallet, so that differing instances of generated tokens generated are different.

Variants of the Embodiment

Many embodiments are possible within the scope and spirit of the invention as will be clear to a skilled reader.

Firstly, although the embodiment shown in FIG. 2 includes both a merchant server 112 (MS) and also a separate merchant application 113 (MA) running on equipment at a point-of-sale, in certain embodiments of the invention there is no separate merchant application at a point-of-sale. Instead, the merchant server itself may be capable of fulfilling the purchase, either by performing a service (such as making a travel booking) or fulfilling a product purchase product (e.g. by dispatching the purchased product to the consumer, or by sending an order to a separate warehouse to do so). In this case, steps 8, 9 and 15 of FIGS. 3 and 4 are omitted.

Secondly, the token need not necessarily encode the (real) payment credentials. Instead, the service provider 114 could issue tokens which are generated using a random or unpredictable number generator. The service provider 114 might keep a database which, for each token it has issued, contains the corresponding payment credentials, so that when the service provider receives a token, it can extract the payment credentials from its database. Alternatively, the service provider 114 might keep a database which, for each token it has issued, indicates the identity of the corresponding consumer, so that the service provider 114 can obtain the payment credentials again from the wallet provider 116.

Thirdly, in principle the operations of the wallet provider 116 and the service provider 114 could be performed by a single server (so that the messages of steps 3 and 4 are unnecessary).

This variation would, for example, be appropriate if the card issuing bank happens to be the same as the acquiring bank 113.

Fourthly, although FIGS. 2 and 3 refer to a single merchant server 112 and a single service provider server 114, in some embodiments either of these roles may be implemented using multiple servers which cooperate together to play the role. Thus, for example, a merchant may maintain multiple servers, e.g. distant from each other, which cooperate to present a consumer website to consumers.

The invention claimed is:

1. A method of securing a payment to a merchant using a payment card which has been registered with a database and which is associated with a consumer, the database containing payment credentials for the payment card, the method comprising the operations of:
   (a) a merchant server associated with the merchant receiving from the consumer an instruction that a payment card registered with the database is to be used for the payment;
   (b) the merchant server transmitting to a service provider a message instructing execution of a payment transaction using the payment card;
   (c) the service provider, via a service provider processor, transmitting a message to a wallet provider to request payment credentials, and in response to the request to receive payment credentials, the service provider: (i) obtains the payment credentials of the payment card from the database of the wallet provider, (ii) generates a token using at least the payment credentials and encoding an identity of the merchant server, (iii) transmits the token to the merchant server, and (iv) deletes the payment credentials after generation of the token;
   (d) the merchant server obtaining a transaction amount from a merchant application, and transmitting to the service provider a transaction authorization request comprising the transaction amount and the token;
   (e) the service provider, via the service provider processor, upon receiving the transaction authorization request 1. determining the merchant server that transmits the transaction authorization request is the same merchant server whose identity is used to generate the token, 2. in response to the determination, de-tokenizing the token by regenerating the payment credentials, and 3. in response to the de-tokenization, obtaining authorization for a transaction of the transaction amount from an issuer server, and sending a message to the merchant server indicating that the authorization has been received; and
   (f) in response to obtaining authorization for the transaction, transmitting a payment settlement request.

2. A method according to claim 1 in which the database is maintained by a wallet provider operated by the issuing bank of the payment card, and the service provider is operated by a bank at which the merchant maintains an account.

3. A method according to claim 2 in which the service provider obtains the payment credentials by submitting a request to the wallet provider, whereupon the wallet provider interacts with the consumer to confirm the identity of the consumer, and upon confirming the identity of the user, transmits the payment credentials for the payment card to the service provider.

4. A method according to claim 1, in which the merchant server is in communication with one or more merchant applications running at one or more corresponding points-of-sale distant from the server, and
   following step (e) the merchant server transmits to the merchant application at one of the points-of-sale a message indicating that the payment is approved, the consumer receiving, in response to the payment, a product or a service at the said point-of-sale.

5. A method according to claim 1 in which, upon receiving the transaction authorization request, the processor of the service provider checks that it has not previously received a transaction authorization request containing the same token, operation (e) only being performed in the case that the check has a positive result.

6. A method according to claim 1, wherein, the token is merchant-specific.

7. A method according to claim 1, wherein the token is generated for each transaction.

8. A method according to claim 1, wherein the payment credentials is a primary account number.

9. A method according to claim 1, wherein the merchant server obtains a transaction amount from a merchant application in response to receiving a selection of at least one item for purchase from the consumer.

10. A method according to claim 9, further comprising, in response to the decryption, the service provider:
    sending the payment credentials to an issuer server, and
    obtaining, in response to sending the payment credentials, authorization for the transaction.

11. A method according to claim 10, further comprising:
    sending a message from the merchant server to a consumer application that the payment has been authorized; and
    sending a message from the merchant server to the merchant application that the payment has been authorized.

12. A service provider server for securing a payment to a merchant using a payment card which has been registered with a database and which is associated with a consumer, the database containing payment credentials for the payment card, the server being in communication with a merchant server operated by the merchant, and including a processor operative to perform functions as follows:
    receiving from the merchant server a message instructing execution of a payment transaction using the payment card;
    obtaining the payment credentials of the payment card from the database, in response to receipt of a message at a wallet provider requesting payment credentials to receive payment credentials, wherein the database is provided by the wallet provider;
generating a token using at least the payment credentials and encoding an identity of the merchant server;
deleting the payment credentials after generation of the token;
transmitting the token to the merchant server;
receiving from the merchant server a transaction authorization request comprising the transaction amount and the token, wherein the merchant server receives the transaction amount from a merchant application;
determining the merchant server that sent the transaction authorization request is the same merchant server whose identity is used to generate the token;
de-tokenizing the token, in response to the determination, by regenerating the payment credentials;
obtaining authorization for a transaction of the transaction amount from a server of an issuer associated with the payment card in response to the de-tokenization; and
transmitting a payment settlement request in response to the obtained authorization for the transaction;
sending a message to the merchant server indicating that the authorization has been received.

13. A service provider server according claim 12, in which the processor is arranged:
upon receiving the transaction authorization request, to check that the service provider server has not previously received a transaction authorization request containing the same token, and
only to obtain authorization for the transaction in the case that the check has a positive result.

14. A service provider according to claim 12, in which the processor is arranged to encrypt the token before passing it to the merchant server, and upon receiving it from the merchant server to decrypt it.

15. A method for securing a payment to a merchant using a payment card which has been registered with a database and which is associated with a consumer, the database containing payment credentials for the payment card, the method comprising the operations of a processor of a service provider:
receiving from a merchant server operated by the merchant a message instructing execution of a payment transaction using the payment card;
obtaining the payment credentials of the payment card from the database, in response to receipt of a message at a wallet provider, the message requesting payment credentials, wherein the database is provided by the wallet provider;
generating a token using at least the payment credentials and encoding an identity of the merchant server;
deleting the payment credentials after generation of the token;
transmitting the token to the merchant server;
receiving from the merchant server a transaction authorization request comprising the transaction amount and the token, wherein the merchant server receives the transaction amount from a merchant application;
verifying the merchant server that transmits the transaction authorization request is the same merchant server whose identity is used to generate the token;
de-tokenizing, in response to the verification, the token by regenerating the payment credentials;
obtaining, in response to the de-tokenization, authorization for a transaction of the transaction amount;
in response to obtaining authorization for the transaction, transmitting a payment settlement request; and
sending a message to the merchant server indicating that the authorization has been received.

16. A method according to claim 15 in which the processor encrypts the token before transmitting it to the merchant server, and decrypts the token upon receiving it from the merchant server.

17. A method according claim 15, in which the processor:
upon receiving the transaction authorization request, checks that the service provider server has not previously received a transaction authorization request containing the same token, and
only obtains authorization for the transaction in the case that the check has a positive result.

* * * * *